(12) United States Patent
Gavieres

(10) Patent No.: US 10,975,831 B2
(45) Date of Patent: Apr. 13, 2021

(54) HYDROELECTRIC POWER SYSTEM

(71) Applicant: Gene Gavieres, Lakewood, CA (US)

(72) Inventor: Gene Gavieres, Lakewood, CA (US)

( * ) Notice: Subject to any disclaimer, the term of this patent is extended or adjusted under 35 U.S.C. 154(b) by 75 days.

(21) Appl. No.: 16/352,728

(22) Filed: Mar. 13, 2019

(65) Prior Publication Data

US 2020/0291917 A1 Sep. 17, 2020

(51) Int. Cl.
*F03B 13/06* (2006.01)
*F03B 13/08* (2006.01)

(52) U.S. Cl.
CPC ............ *F03B 13/06* (2013.01); *F03B 13/086* (2013.01)

(58) Field of Classification Search
CPC ................................. F03B 13/06; F03B 13/086
See application file for complete search history.

(56) References Cited

U.S. PATENT DOCUMENTS

| | | | | | |
|---|---|---|---|---|---|
| 3,214,915 A | * | 11/1965 | Weibel | ................... | F03B 13/06 60/398 |
| 4,182,123 A | * | 1/1980 | Ueda | ................... | F03B 13/086 137/123 |
| 4,282,444 A | * | 8/1981 | Ramer | ................... | F03B 13/06 290/1 R |
| 4,324,349 A | * | 4/1982 | Kaufman | ................. | A47K 5/12 222/207 |
| 4,625,752 A | * | 12/1986 | George | ................. | A01K 63/04 137/124 |
| 4,698,516 A | * | 10/1987 | Thompson | .............. | F03B 13/06 290/54 |
| 8,823,195 B2 | * | 9/2014 | Legacy | ................... | F03B 13/08 290/52 |
| 9,261,068 B2 | * | 2/2016 | Barakat | ................... | F03B 13/00 |

* cited by examiner

*Primary Examiner* — F Daniel Lopez
(74) *Attorney, Agent, or Firm* — John D. Tran; Rhema Law Group

(57) ABSTRACT

A hydroelectric power system can include: a first level including a drain system, the drain system including a bell siphon coupled to a mixed flow turbine and a cross flow turbine, the drain system configured to provide a path way for a working fluid to flow from the bell siphon, through the mixed flow turbine, and through the cross flow turbine; and a second level below the first level, the second level for receiving the working fluid from the cross flow turbine of the drain system of the first level.

14 Claims, 4 Drawing Sheets

HYDROELECTRIC POWER SYSTEM

TECHNICAL FIELD

This disclosure relates to power, more particularly to hydroelectric power.

BACKGROUND

Global demands for power are increasing at a tremendous rate. By some estimates, doubling roughly every few years; yet the worlds natural resources, such as fossil fuels, are rapidly being depleted. The development of other sources such as new steam or nuclear plants are impeded.

New sources of nonpolluting power are urgently in need. The primary sources of power are hydroelectric, the so-called fossil fuels, natural gas and nuclear plants. Aside from regulatory restraints, the most common restraints with current power generation methods stem from highly restricted environmental input requirements of the systems.

Solar, for instance must be deployed in locations with adequate sunlight. Any material limit in the amount of sunlight received by the solar system will necessarily limit the energy output of the photovoltaic system.

Wind turbines, likewise, must be erected in locations with regular forceful wind. When the wind stills, the power stops.

Geothermal power requires access to high temperatures under the surface of the ground. Sufficiently high temperatures are only economical accessible in a remarkably few locations world-wide.

The least offensive of these renewable power sources, from a pollution standpoint, is hydroelectric. However, today hydroelectric makes up less than percent of the total power output in the United States.

Although only a small percent of the world's total hydroelectric potential has been utilized, the remaining sources are not readily exploitable and cannot make a very large contribution toward satisfying the growing power demand.

Current hydroelectric power is made by damming up rivers and only generating energy when the water is at acceptable levels. This severely limits the geographic locations where hydroelectric power systems can be deployed. Further, even where rivers can be effectively dammed, rainfall can limit the ability of a hydroelectric plant to generate energy.

Solutions have been long sought but prior developments have not taught or suggested any complete solutions, and solutions to these problems have long eluded those skilled in the art. Thus, there remains a considerable need for devices and methods that can provide regular electric power and operate with less reliance on geographic location and environmental inputs.

SUMMARY

A hydroelectric power system and methods, providing regular electric power and operating with less reliance on geographic location and environmental inputs, are disclosed. The hydroelectric system and methods can include: a first level including a drain system, the drain system including a bell siphon coupled to a mixed flow turbine and a cross flow turbine, the drain system configured to provide a path way for a working fluid to flow from the bell siphon, through the mixed flow turbine, and through the cross flow turbine; and a second level below the first level, the second level for receiving the working fluid from the cross flow turbine of the drain system of the first level.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The hydroelectric system is illustrated in the figures of the accompanying drawings which are meant to be exemplary and not limiting, in which like reference numerals are intended to refer to like components, and in which.

DETAILED DESCRIPTION

Figure 1:
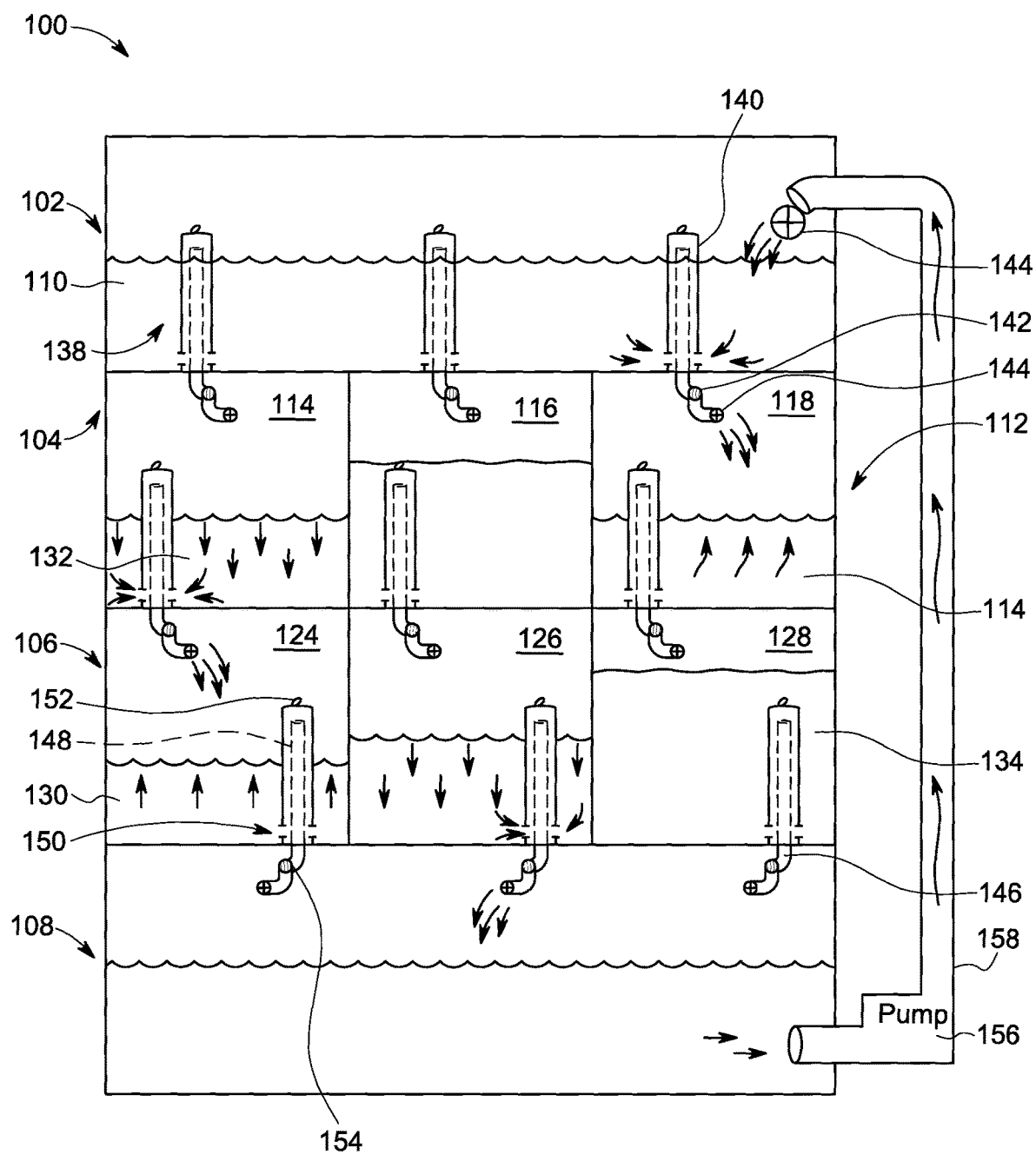
FIG. 1 is a side view of the hydroelectric system in a first embodiment.

In the following description, reference is made to the accompanying drawings that form a part hereof, and in which are shown by way of illustration, embodiments in which the hydroelectric system may be practiced. It is to be understood that other embodiments may be utilized and structural changes may be made without departing from the scope of the hydroelectric system.

When features, aspects, or embodiments of the hydroelectric system are described in terms of steps of a process, an operation, a control flow, or a flow chart, it is to be understood that the steps can be combined, performed in a different order, deleted, or include additional steps without departing from the hydroelectric system as described herein.

The hydroelectric system is described in sufficient detail to enable those skilled in the art to make and use the hydroelectric system and provide numerous specific details to give a thorough understanding of the hydroelectric system; however, it will be apparent that the hydroelectric system may be practiced without these specific details.

In order to avoid obscuring the hydroelectric system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. As used herein, the term "coupled" means contact between elements either directly or indirectly.

For expository purposes, the term "horizontal" as used herein is defined as a plane parallel to the top plane or surface of a chamber floor, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown a side view of the hydroelectric system 100 in a first embodiment. The hydroelectric system 100 is depicted with four levels including a first level 102, a second level 104, a third level 106, and a fourth level 108.

The first level 102 and the fourth level 108 can function and operate as reservoirs for holding reserves of the working fluid 110. It is contemplated that the working fluid 110 can be water, however the hydroelectric system 100 is not intended to be so limited unless explicitly claimed.

The reservoirs of the first level 102 and the fourth level 108 can each, individually be a single large chamber 112. The second level 104 and the third level 106 are each depicted having three of the chambers 112.

For descriptive clarity of FIG. 1, the chambers 112 will be described as a first chamber 114, a second chamber 116, and a third chamber 118 on the second level 104 as well as a first chamber 124, a second chamber 126, and a third chamber 128 on the third level 106. It is contemplated in one embodiment, the chambers 112 of the second level 104 and the chambers 112 of the third level 106 are of identical size.

The hydroelectric system 100 is contemplated to operate in three distinct phases of operation as illustrated, for example in the first chamber 114, the second chamber 116, and the third chamber 118 of the second level 104. The phases of operation can include a filling stage 130, a draining stage 132 and a standby stage 134.

The filling stage 130 is illustratively depicted in the third chamber 118 of the second level 104 and the first chamber 124 of the third level 106. The draining stage 132 is illustratively depicted in the third chamber 118 of the second level 104 and the second chamber 126 of the third level 106.

The standby stage 134 is illustratively depicted in the second chamber 116 of the second level 104 and the third chamber 128 of the third level 106.

It is contemplated that the chambers 112 of the second level 104 and the third level 106 can cycle through the filling stage 130, the standby stage 134, and the draining stage 132. The working fluid 110 can flow from the first level 102 through one of three drain systems 138 into the first chamber 114, the second chamber 116, and the second chamber 126, all of which of the second level 104.

The first chamber 114 of the second level 104 is depicted having the drain system 138 feeding the first chamber 124 of the third level 106. The second chamber 116 of the second level 104 is depicted having the drain system 138 feeding the second chamber 116 of the third level 106. The third chamber 118 of the second level 104 is depicted having the drain system 138 feeding the third chamber 128 of the third level 106.

The first chamber 124, second chamber 126, and the third chamber 128 of the third level 106 can each have one of the drain systems 138 individually coupled thereto and utilized to drain the chambers 112 of the third level 106 into the fourth level 108.

The working fluid 110 can flow from the first level 102, through the drain systems 138 of each chamber 112 and into a subsequent chamber. A subsequent chamber should be understood as a chamber filled by a previous chamber. Illustratively, therefore the first chamber 124 is the subsequent chamber to the first chamber 114; the second chamber 126 is the subsequent chamber to the second chamber 116; and the third chamber 128 is the subsequent chamber to the third chamber 118.

Further, the chamber 112 of the fourth level 108 can be said to be the subsequent chamber of all chambers in third level 106. Yet further, the first chamber 114, the second chamber 116, and the third chamber 118 are all to be considered subsequent chambers to the chamber 112 of the first level 102.

Each chamber on second level 104 can be filled with the working fluid 110 flowing from the chamber 112 of first level 102 through the drain systems 138 of first level 102 and into the chambers 112 of second level 104. For clarity, the filling stage 130 should be understood to have a duration lasting from when the filling stage 130 begins on one of the chambers 112 to when the filling stage 130 ends for the same chamber 112.

Further, the draining stage 132 should be understood to have a duration lasting from when the draining stage 132 begins on one of the chambers 112 to when the draining stage 132 ends for the same chamber 112. Similarly, the standby stage 134 should be understood to have a duration lasting from when the filling stage 130 ends on one of the chambers 112 to when the draining stage 132 begins for the same chamber 112.

It is contemplated that in one embodiment, only a single chamber 112 from the second level 104 and only a single chamber 112 from the third level 106 will be filled at the same time. Alternative embodiments include filling multiple chambers 112 and draining multiple chambers 112 at the same time in the second level 104 and the third level 106.

As is depicted in FIG. 1, the first chamber 114 of the second level 104 is draining the working fluid 110 through the drain system 138 into the first chamber 124 of the third level 106. This therefore depicts the first chamber 114 of the second level 104 in the draining stage 132 while the first chamber 124 of the third level 106 is in the filling stage 130.

As is further depicted in FIG. 1, the second chamber 116 of the second level 104 is not draining the working fluid 110 through the drain system 138, nor is the second chamber 116 being filled with the working fluid 110. Simultaneously, the second chamber 126 of the third level 106 is emptying the working fluid 110, through the drain system 138, into the chamber 112 of the fourth level 108.

Thus, the second chamber 116 of the second level 104 is in the standby stage 134 while the second chamber 126 of the third level 106 is in the draining stage 132. As is yet further depicted in FIG. 1, the third chamber 118 of the second level 104 is being filled from the chamber 112 of first level 102 through the drain system 138, which connects the chamber 112 of the first level 102 to the third chamber 118 of the second level 104.

The third chamber 128 of the third level 106 is not draining the working fluid 110 through the drain system 138, nor is the third chamber 128 being filled with the working fluid 110. The third chamber 118 of second level 104 is therefore in the filling stage 130 while the third chamber 128 of third level 106 is in the standby stage 134.

In some embodiments, it is contemplated that the second level 104 and the third level 106 can be operated without the standby stage 134 and function in the draining stage 132 and the filling stage 130 only. Alternative embodiments can include more than two chambers within the second level 104 and third level 106.

When more than two of the chambers 112 are used, the standby stage 134 can be implemented to ensure proper timing of the hydroelectric system 100, which ensures that only one chamber 112 per level is in the draining stage 132 at any given time. Yet other contemplated embodiments include operating multiple chambers 112 within either the second level 104 or the third level 106, simultaneously, in either the filling stage 130 or the draining stage 132.

The draining stage 132 is shown having a bell siphon 140 coupled to a mixed flow turbine 142. The mixed flow turbine 142 is shown coupled to a cross flow turbine 144.

The mixed flow turbine 142 can be a Francis turbine. With the mixed flow turbine 142 or the "Francis turbines" the working fluid 110 enters radially and leaves axially. The mixed flow turbine 142 can work efficiently under a wide range of operating conditions.

A carefully designed draft tube 146 can be fitted at the draft side of the mixed flow turbine 142. The draft tube 146 can therefore couple the draft side of the mixed flow turbine 142 to the input side of the cross flow turbine 144.

The bell siphon 140 can further include a stand pipe 148, a fluid inlet 150, a check valve 152, and a control door 154. As the working fluid 110 rises in one of the chambers 112 during the filling stage 130, the bell siphon 140 will fill with water through the fluid inlet 150.

The working fluid 110 will rise within the chamber 112 and within the bell siphon 140 until the stand pipe 148 begins to allow the working fluid 110 to flow therethrough. Once the working fluid 110 begins to flow through the stand pipe 148, a fluid lock will be created within the bell siphon 140 and the stand pipe 148.

The fluid lock will pull the rest of the air and working fluid 110 in through the stand pipe 148 forcing the chamber 112 into the draining stage 132, unless blocked by the control door 154 between the stand pipe 148 and the mixed flow turbine 142. If the working fluid 110 flow through the drain system 138 is blocked by the control door 154, the chamber 112 can be said to be in the standby stage 134.

The fluid lock will persist within the bell siphon 140 until the level of the working fluid 110 in the chamber 112 is low enough to allow gas to enter through the fluid inlet 150 and break the fluid lock within the bell siphon 140. Illustratively, the drain system 138 of first level 102 can be automated and synchronized utilizing the control door 154. Specifically, the proper timing of the control door 154 within the drain systems 138 of the first level 102 can ensure the proper filling and draining of the subsequent chambers.

Once the working fluid 110 drains into the chamber 112 of the fourth level 108, the working fluid 110 can be pumped back to the chamber 112 of the first level 102 with a pump 156 coupled to a return line 158. The return line 158 can channel the working fluid 110 from the fourth level 108 to the first level 102.

It is contemplated that the return line 158 can have a cross flow turbine 144 coupled to the output of the return line 158. The cross flow turbine 144 on the return line 158 can help to recover some of the potential energy lost due to the working fluid 110 being pumped to a level above the level of the working fluid 110 within the chamber 112 of the first level 102.

Figure 2:
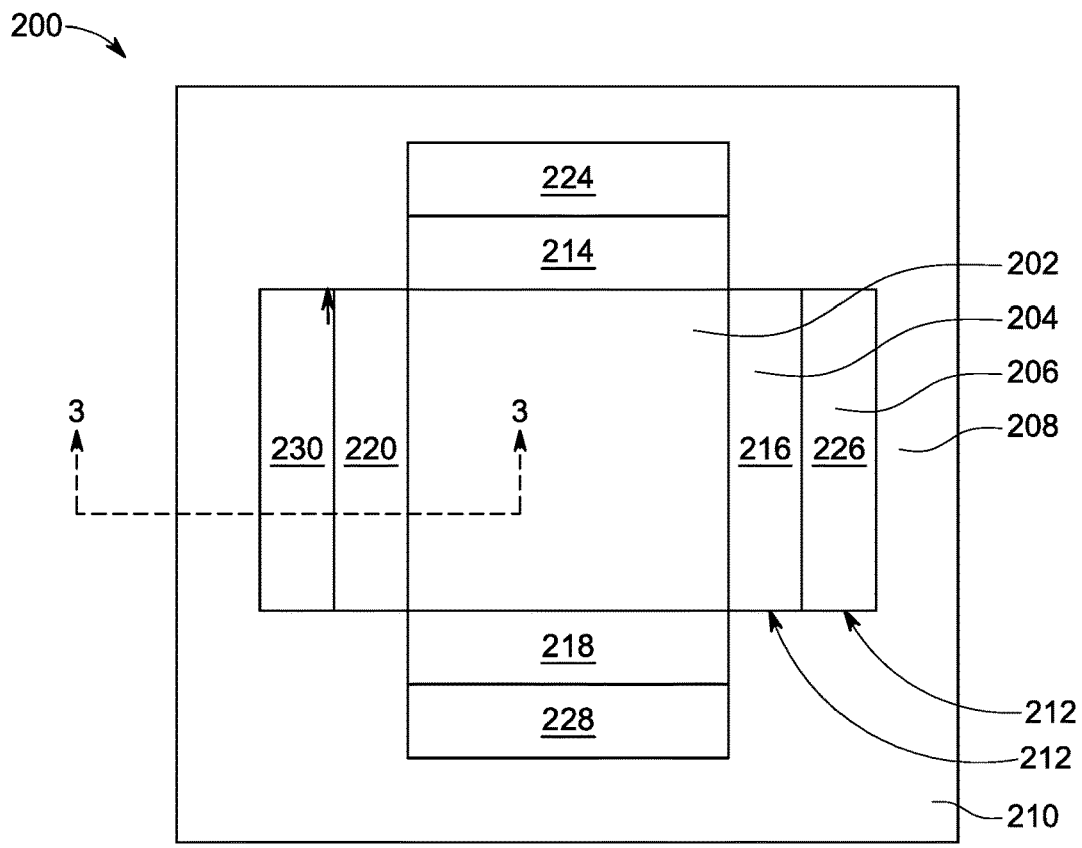
FIG. 2 is a top view of the hydroelectric system in a second embodiment.

Referring now to FIG. 2, therein is shown a top view of the hydroelectric system 200 in a second embodiment. The hydroelectric system 200 in the second embodiment is similar to the hydroelectric system 100 of FIG. 1.

The hydroelectric system 200 is depicted with four levels including a first level 202, a second level 204, a third level 206, and a fourth level 208.

The first level 202 and the fourth level 208 can function and operate as reservoirs for holding reserves of the working fluid 210. It is contemplated that the working fluid 210 can be water, however the hydroelectric system 200 is not intended to be so limited unless explicitly claimed.

The reservoirs of the first level 202 and the fourth level 208 can each, individually be a single large chamber 212. The second level 204 and the third level 206 are each depicted having four of the chambers 212.

For descriptive clarity of FIG. 2, the chambers 212 will be described as a first chamber 214, a second chamber 216, a third chamber 218, and a fourth chamber 220 on the second level 204 as well as a first chamber 224, a second chamber 226, a third chamber 228, and a fourth chamber 230 on the third level 206. It is contemplated in one embodiment, the chambers 212 of the second level 204 and the chambers 212 of the third level 206 are of identical size.

As will be appreciated, the primary distinction between the first embodiment of FIG. 1 and the second embodiment of FIG. 2 is the inclusion of an additional chamber in both the second level 204 and the third level 206 for the second embodiment. That is the fourth chamber 220 of the second level 204, and the fourth chamber 230 of the third level 206 are included in the second embodiment.

The hydroelectric system 200 is contemplated to operate in the same three distinct phases of operation as illustrated, for example in FIG. 1. It is contemplated that the additional chambers 212 in the second level 204 and the third level 206 can require the addition of a second standby stage for each of the second level 204 and the third level 206. This can ensure that only one of the chambers 212 drains at any given time on both the second level 204 and the third level 206.

Alternatively, it is contemplated that the chambers 212 of the second level 204 and the third level 206 could be operated with two of the chambers 212 in each level simultaneously in the filling stage and in the draining stage. Further it is contemplated that when an even number of chambers 212 are used on the second level 204 and the third level 206, the hydroelectric system 200 could operate the chambers 212 of the second level 204 and the third level 206 with only the filling stage and the draining stage, without the standby stage. Yet further, it is contemplated that when an odd number of chambers 212 are used on the second level 204 and the third level 206, the hydroelectric system 200 could operate the chambers 212 of the second level 204 and the third level 206 with the filling stage, the draining stage, and the standby stage.

Figure 3:
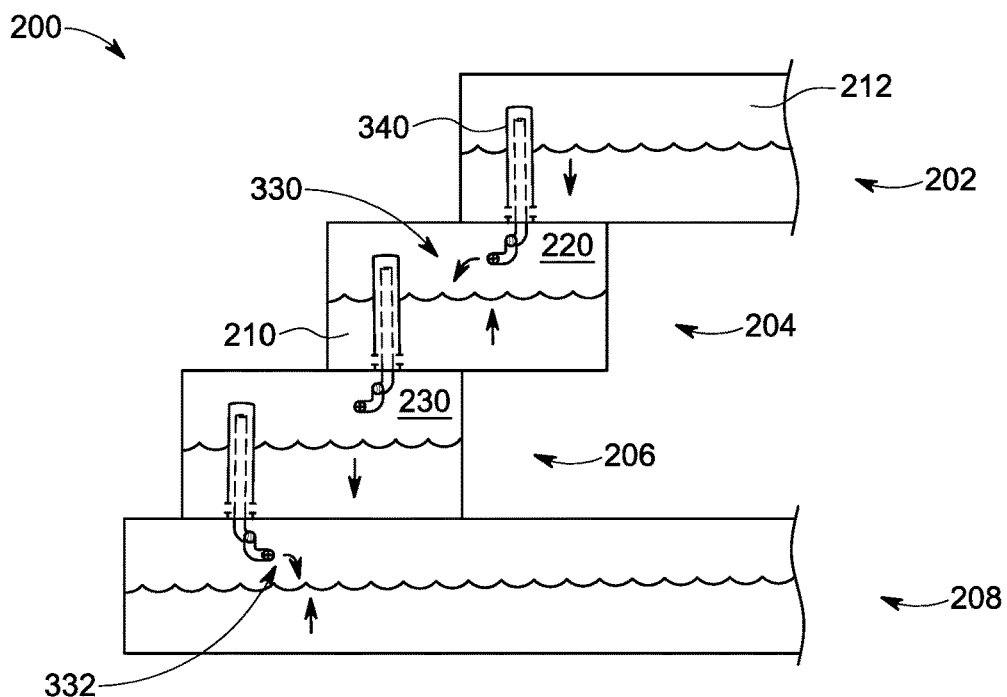
FIG. 3 is a side view of the hydroelectric system along the line 3-3 of FIG. 2.

Referring now to FIG. 3, therein is shown a side view of the hydroelectric system 200 along the line 3-3 of FIG. 2. The hydroelectric system 200 is shown with the chamber 212 of the first level 202 filling the fourth chamber 220 of the second level 204, placing the fourth chamber 220 in a filling stage 330.

The fourth chamber 230 of the third level 206 is also shown in a draining stage 332 by draining the working fluid 210 through the drain system 138 into the chamber 112 of the fourth level 108.

It is contemplated that the chambers 212 of the second level 204 and the third level 206 can cycle through the filling stage 230, the standby stage 234, and the draining stage 232. The working fluid 210 can flow from the first level 202 through one of three drain systems 338 into the first chamber 214, the second chamber 216, and the second chamber 226, all of which of the second level 204.

The fourth chamber 220 of the second level 204 is depicted having the drain system 338 feeding the fourth chamber 230 of the third level 206. The fourth chamber 230 of the third level 206 can have one of the drain systems 338 individually coupled thereto and utilized to drain the chambers 212 of the third level 206 into the fourth level 208. The working fluid 210 can flow from the first level 202, through the drain systems 338 of each chamber 212 and into subsequent chambers.

Figure 4:
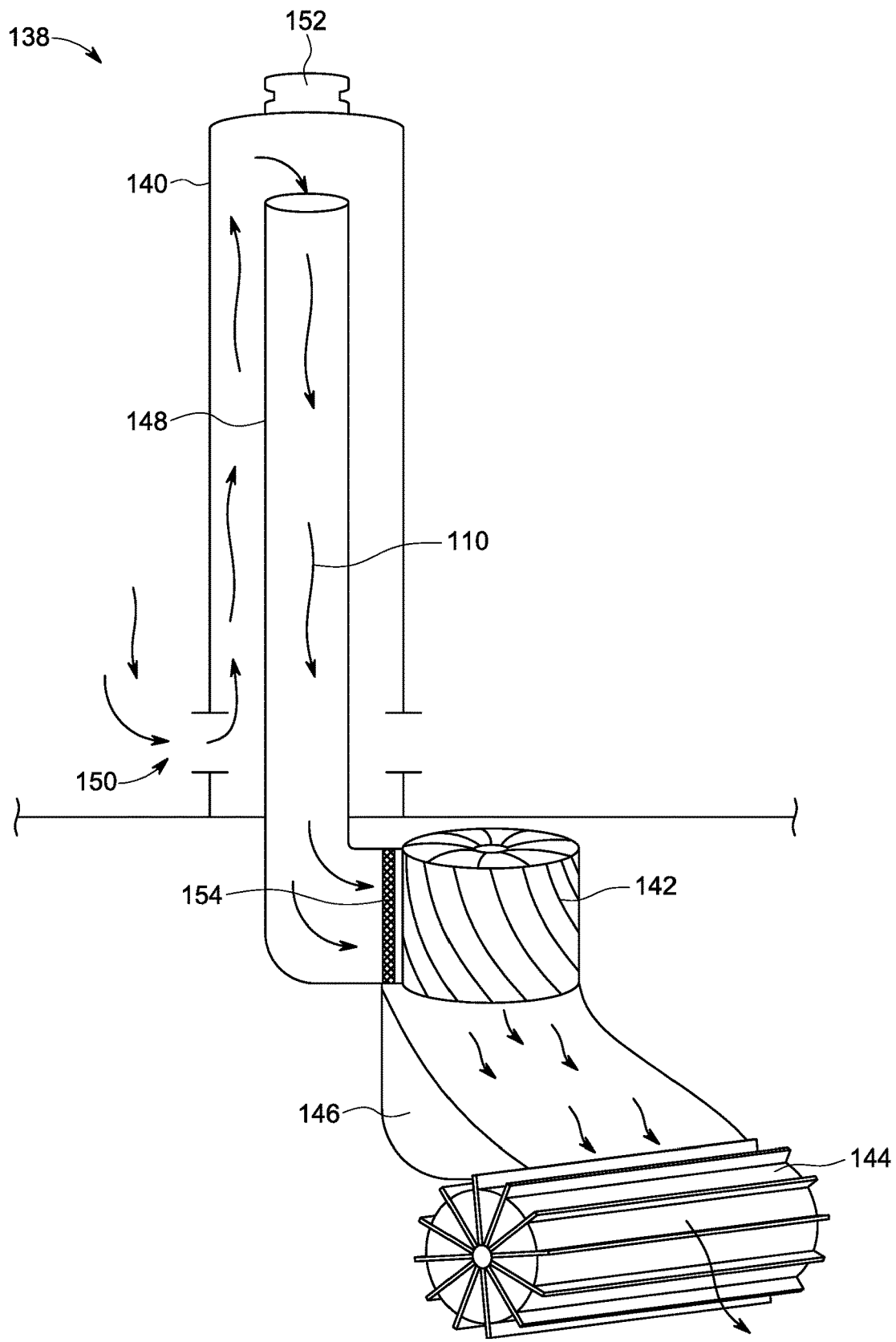
FIG. 4 is a diagrammatic view of the drain system for use in any embodiment of the hydroelectric system.

Referring now to FIG. 4, therein is shown a diagrammatic view of the drain system 138 of for use in any embodiment of the hydroelectric system. It is however contemplated, that the drain system 138 could be identical to the drain system 338 of FIGS. 2 and 3. For descriptive clarity, the drain system 138 will be described utilizing the reference numerals of the drain system 138 for the first embodiment of FIG. 1.

The drain system 138 is depicted having the bell siphon 140 coupled to the mixed flow turbine 142. The mixed flow turbine 142 is shown coupled to the cross flow turbine 144.

The mixed flow turbine 142 can be a Francis turbine. With the mixed flow turbine 142 or the "Francis turbines" the working fluid 110 enters radially and leaves axially. The mixed flow turbine 142 can work efficiently under a wide range of operating conditions.

The draft tube 146 can be fitted at the draft side of the mixed flow turbine 142. The draft tube 146 can therefore couple the draft side of the mixed flow turbine 142 to the input side of the cross flow turbine 144.

The bell siphon 140 I depicted with the stand pipe 148, the fluid inlet 150, the check valve 152, and the control door 154. As the working fluid 110 rises in one of the chambers 112 of FIG. 1 during the filling stage 130, the bell siphon 140 will fill with water through the fluid inlet 150.

The working fluid 110 will rise within the chamber 112 and within the bell siphon 140 until the stand pipe 148 begins to allow the working fluid 110 to flow therethrough. Once the working fluid 110 begins to flow through the stand pipe 148, a fluid lock will be created within the bell siphon 140 and the stand pipe 148.

The fluid lock will pull the rest of the air and working fluid 110, within the bell siphon 140, in through the stand pipe 148 forcing the chamber 112 into the draining stage 132, unless blocked by the control door 154 between the stand pipe 148 and the mixed flow turbine 142. If the working fluid 110 flow through the drain system 138 is blocked by the control door 154, the chamber 112 can be said to be in the standby stage 134.

The fluid lock will persist within the bell siphon 140 until the level of the working fluid 110 in the chamber 112 is low enough to allow gas to enter through the fluid inlet 150 and break the fluid lock within the bell siphon 140. Illustratively, the drain system 138 of first level 102 can be automated and synchronized utilizing the control door 154. Specifically, the proper timing of the control door 154 within the drain systems 138 of the first level 102 can ensure the proper filling and draining of the subsequent chambers.

Figure 5:
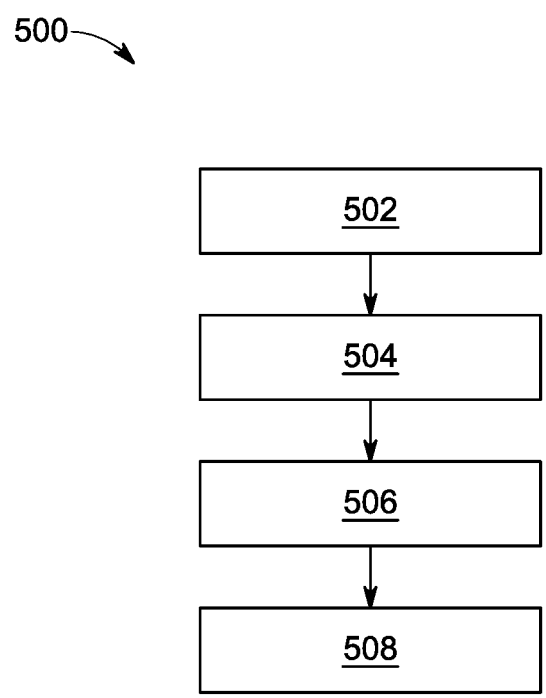
FIG. 5 is a method of operation for the hydroelectric system.

Referring now to FIG. 5, therein is shown a method of operation for the hydroelectric system 100 of FIG. 1. The method of operation can include: providing a first level including a single chamber for containing working fluid in a block 502, affixing a second level to the first level, the second level for receiving the working fluid from the first level, the second level including a first chamber and a second chamber in a block 504, affixing a third level to the second level, the third level including a first chamber and a second chamber, the first chamber of the third level for receiving the working fluid from the first chamber of the second level, the second chamber of the third level for receiving the working fluid from the second chamber of the second level in a block 506, and coupling drain systems to outputs of the first level, the second level, and the third level, each one of the drain systems including a bell siphon coupled to a mixed flow turbine and a cross flow turbine, the drain systems configured to provide a path way for the working fluid to flow from the bell siphon, through the mixed flow turbine, and through the cross flow turbine, the first chamber of the second level together with the second chamber of the second level each including one of the drain systems coupled thereto and configured to allow only the first chamber of the second level or the second chamber of the second level to drain at a time, the first chamber of the third level together with the second chamber of the third level each including one of the drain systems coupled thereto and configured to allow only the first chamber of the third level or the second chamber of the third level to drain at a time, the single chamber of the first level 102 including one of the drain systems for both the first chamber of the second level and second chamber of the second level, the drain systems configured to operate the first chamber of the second level in a draining stage and the second chamber of the second level in a standby stage or a filling stage, the drain systems configured to operate the second chamber of the second level in the draining stage and the first chamber of the second level in the standby stage or the filling stage, the drain systems configured to operate the first chamber of the third level in the draining stage and the second chamber of the third level in a standby stage or filling stage, the drain systems configured to operate the second chamber of the second level in a draining stage and the first chamber of the second level in a standby stage or filling stage, the first chamber of the third level being in a filling stage based on the first chamber of the second level being in a draining stage, the second chamber of the third level being in a filling stage based on the second chamber of the second level being in a draining stage in a block 508.

Thus, it has been discovered that the hydroelectric system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the hydroelectric system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A hydroelectric power system comprising:
   a first level including a drain system, the drain system including a bell siphon coupled to a mixed flow turbine and a cross flow turbine, the bell siphon includes a check valve, a fluid inlet, and a stand pipe, the drain system configured to provide a path way for a working fluid to flow from the bell siphon, through the mixed flow turbine, and through the cross flow turbine; and
   a second level below the first level, the second level for receiving the working fluid from the cross flow turbine of the drain system of the first level.

2. The system of claim 1 wherein the drain system includes a draft tube coupling the mixed flow turbine with the cross flow turbine.

3. The system of claim 1 wherein the drain system includes a control door for delaying the operation of a draining stage for the drain system.

4. The system of claim 1 further comprising a pump coupled to a return line for moving the working fluid from the second level back to the first level.

5. A hydroelectric power system comprising:
a first level including a single chamber for containing working fluid;
a second level below the first level, the second level including a first chamber and a second chamber, the first chamber and the second chamber of the second level for selectively receiving the working fluid from the first level via respective first and second drain systems;
a third level below the second level, the third level including a first chamber and a second chamber, the first chamber of the third level for selectively receiving the working fluid from the first chamber of the second level via a third drain system, the second chamber of the third level for selectively receiving the working fluid from the second chamber of the second level via a fourth drain system; and
wherein the first drain system, the second drain system, the third drain system, and the fourth drain system each include a bell siphon coupled to a mixed flow turbine and a cross flow turbine configured to provide a path way for the working fluid to flow from the bell siphon, through the mixed flow turbine, and through the cross flow turbine, wherein only the first chamber of the second level or the second chamber of the second level is allowed to drain at a time, wherein only the first chamber of the third level or the second chamber of the third level is allowed to drain at a time, the second chamber of the second level being in a standby stage or a filling stage based on the first chamber of the second level being in a draining stage, the first chamber of the second level in the standby stage or the filling stage based on the second chamber of the second level being in the draining stage, the second chamber of the third level in the standby stage or the filling stage based on the first chamber of the third level being in the draining stage, the first chamber of the third level in the standby stage or the filling stage based on the second chamber of the third level being in the draining stage, the first chamber of the third level being in the filling stage based on the first chamber of the second level being in the draining stage, and the second chamber of the third level being in the filling stage based on the second chamber of the second level being in the draining stage.

6. The system of claim 5 further comprising a fourth level, the fourth level providing a reservoir for the first chamber of the third level and the second chamber of the third level to drain into.

7. The system of claim 5 further comprising a fourth level having a pump coupled to a return line, the return line including an additional cross flow turbine coupled to an output of the return line, the output of the return line for filling the first level with the working fluid.

8. A method of manufacturing a hydroelectric power system comprising:
mounting a first level above a second level, the first level including a drain system, the drain system including a bell siphon coupled to a mixed flow turbine and a cross flow turbine, the bell siphon includes a check valve, a fluid inlet, and a stand pipe, the drain system configured to provide a path way for a working fluid to flow from the bell siphon, through the mixed flow turbine, and through the cross flow turbine, and the second level below the first level, the second level for receiving the working fluid from the cross flow turbine of the drain system of the first level.

9. The method of claim 8 wherein mounting the first level includes mounting the first level with the drain system having a draft tube coupling the mixed flow turbine with the cross flow turbine.

10. The method of claim 8 wherein mounting the first level includes mounting the first level with the drain system having a control door for delaying the operation of a draining stage for the drain system.

11. The method of claim 8 further comprising coupling a pump to a return line for moving the working fluid from the second level back to the first level.

12. A method for manufacturing a hydroelectric power system comprising:
providing a first level including a single chamber for containing working fluid;
affixing a second level to the first level, the second level including a first chamber and a second chamber, the first chamber and the second chamber of the second level for selectively receiving the working fluid from the first level via respective first and second drain systems;
affixing a third level to the second level, the third level including a first chamber and a second chamber, the first chamber of the third level for selectively receiving the working fluid from the first chamber of the second level via a third drain system, the second chamber of the third level for selectively receiving the working fluid from the second chamber of the second level via a fourth drain system; and
wherein the first drain system, the second drain system, the third drain system, and the fourth drain system each include a bell siphon coupled to a mixed flow turbine and a cross flow turbine configured to provide a path way for the working fluid to flow from the bell siphon, through the mixed flow turbine, and through the cross flow turbine, wherein only the first chamber of the second level or the second chamber of the second level is allowed to drain at a time, wherein only the first chamber of the third level or the second chamber of the third level is allowed to drain at a time, the second chamber of the second level in a standby stage or a filling stage based on the first chamber of the second level being in a draining stage, the first chamber of the second level in the standby stage or the filling stage based on the second chamber of the second level being in the draining stage, the second chamber of the third level in the standby stage or the filling stage based on the first chamber of the third level being in the draining stage, the first chamber of the third level in the standby stage or the filling stage based on the second chamber of the third level being in the draining stage, the first chamber of the third level being in the filling stage based on the first chamber of the second level being in the draining stage, and the second chamber of the third level being in the filling stage based on the second chamber of the second level being in the draining stage.

13. The method of claim 12 further comprising affixing a fourth level, the fourth level providing a reservoir for the first chamber of the third level and the second chamber of the third level to drain into.

14. The method of claim 12 further comprising affixing a fourth level having a pump coupled to a return line, the return line including an additional cross flow turbine coupled to an output of the return line, the output of the return line for filling the first level with the working fluid.

* * * * *